United States Patent [19]

Ilcisin et al.

[11] Patent Number: 5,903,325
[45] Date of Patent: May 11, 1999

[54] PLASMA ADDRESSED LIQUID CRYSTAL DISPLAY PANEL WITH OPTIMIZED RELATIONSHIP BETWEEN LIQUID CRYSTAL PARAMETERS AND COVER SHEET THICKNESS

[75] Inventors: Kevin J. Ilcisin; Thomas S. Buzak, both of Beaverton, Oreg.; Paul C. Martin, Vancouver, Wash.

[73] Assignee: Tektronix, Inc., Wilsonville, Oreg.

[21] Appl. No.: 08/893,650

[22] Filed: Jul. 11, 1997

Related U.S. Application Data

[60] Provisional application No. 60/021,677, Jul. 12, 1996.

[51] Int. Cl.⁶ ........................................... G02F 1/133
[52] U.S. Cl. ............................... 349/32; 349/122
[58] Field of Search ........................... 349/32, 122

[56] References Cited

U.S. PATENT DOCUMENTS

| | | | |
|---|---|---|---|
| 5,414,440 | 5/1995 | Ilcisin et al. | 345/58 |
| 5,805,122 | 9/1998 | Bongaerts et al. | 345/60 |
| 5,841,411 | 11/1998 | Francis | 345/58 |

*Primary Examiner*—Hung Xuan Dang
*Assistant Examiner*—Joanne Kim
*Attorney, Agent, or Firm*—John D. Winkelman; John Smith-Hill

[57] ABSTRACT

In a plasma addressed liquid crystal display panel comprising a channel substrate, a cover sheet, a layer of twisted nematic liquid crystal material, an upper substrate, and an array of electrodes on the lower surface of the upper substrate, $$[2.43(V_{90} - V_{50}) + V_{50}]\left[1 + \frac{d_{TD}}{d_{LC}} \cdot \frac{\varepsilon_{\parallel}}{\varepsilon_{TD}}\right] - 0.9V_{10}\left[1 + \frac{d_{TD}}{d_{LC}} \cdot \frac{\varepsilon_{\perp}}{\varepsilon_{TD}}\right] \leq 25$$

where $V_x$ is the voltage that will turn a simple TN liquid crystal cell from the off state to X% transmissive in a normally black mode, $d_{TD}$ is the thickness of the cover sheet, $d_{LC}$ is the thickness of the liquid crystal layer, $\varepsilon_{TD}$ is the dielectric constant of the cover sheet, $\varepsilon_{\perp}$ is the perpendicular dielectric constant of the liquid crystal material, and $\varepsilon_{\parallel}$ is the parallel dielectric constant of the liquid crystal material, and $d_{LC}\Delta n_{LC}$ is in the range from about 0.4 to 0.5, where $\Delta n_{LC}$ is the difference in refractive indices for the liquid crystal material.

2 Claims, 2 Drawing Sheets

PLASMA ADDRESSED LIQUID CRYSTAL DISPLAY PANEL WITH OPTIMIZED RELATIONSHIP BETWEEN LIQUID CRYSTAL PARAMETERS AND COVER SHEET THICKNESS

CROSS REFERENCED TO RELATED APPLICATIONS

This application claims the benefit of U.S. Provisional Application No. 60/021,677, filed Jul. 12, 1996.

BACKGROUND OF THE INVENTION

This invention relates to a plasma addressed liquid crystal display panel with an optimized relationship between liquid crystal parameters and cover sheet thickness.

U.S. Pat. No. 5,077,553 discloses apparatus for addressing data storage elements. A practical implementation of the apparatus shown in U.S. Pat. No. 5,077,553 is illustrated schematically in FIG. 2 of the accompanying drawings.

The display panel shown in FIG. 2 comprises, in sequence from below, a polarizer 2, a channel substrate 4, a cover sheet 6 (commonly known as a microsheet), a layer 10 of twisted nematic (TN) liquid crystal material, an array of parallel transparent data drive electrodes (only one of which, designated 12, can be seen in the view shown in FIG. 2), an upper substrate 14 carrying the data drive electrodes, and an upper polarizer 16. The channel substrate 4 is typically made of glass and is formed with multiple parallel channels 20 in its upper main face. The channels 20 are filled with an ionizable gas, such as helium. A ground electrode and a strobe electrode (not shown) are provided in each of the channels 20. The channels 20 are orthogonal to the data drive electrodes and the region where a data drive electrode crosses a channel (when viewed perpendicularly to the panel) forms a discrete panel element 26. Each panel element can be considered to include elements of the layer 10 and the upper and lower polarizers 2 and 16. In the case of a color display panel, the panel elements include color filters (not shown) between the layer 10 and the upper substrate 14. The region of the upper surface of the display panel that bounds the panel element constitutes a single pixel 28 of the display panel.

As explained in U.S. Pat. No. 5,077,553, when a suitable potential difference is established between the strobe and ground electrodes in one of the channels, the gas in that channel forms a plasma that provides a conductive path at the lower surface of the cover sheet 6. If the data drive electrode is at ground potential, there is no significant electric field in the volume element of TN liquid crystal material and the pixel is considered to be off, whereas if the data drive electrode is at a substantially different potential from ground, there is a substantial electric field in that volume element of liquid crystal material and the pixel is considered to be on. An extended light source (not shown) is provided beneath the panel. In the event that a pixel is off, the upper polarizer passes light received from the volume element of liquid crystal material and the pixel is illuminated, whereas if a pixel is on, the upper polarizer blocks light received from the volume element of liquid crystal material and the pixel is not illuminated. Black surround material (not shown) is provided between adjacent panel elements in order to absorb stray light and preserve maximum contrast between a pixel that is on and a pixel that is off.

The simple twisted nematic (TN) liquid crystal display panel that is shown in FIG. 3 comprises lower and upper substrates 40, 42 having respective arrays of electrodes 44, 46 thereon, with the two arrays of electrodes being oriented perpendicular to each other as rows and columns respectively, and a layer 48 of TN liquid crystal material between the two substrates. A rectangular matrix of pixels is defined by the crossing areas of the row and column electrodes. As in the case of the PALC display panel shown in FIG. 2, there is a lower polarizer 50 beneath the lower substrate 40 and an upper polarizer 52 above the upper substrate. An extended light source (not shown) is provided beneath the panel, and in the event that a pixel is off (no potential difference between the row and column electrodes), the upper polarizer passes light received from the volume element of liquid crystal material and the pixel is illuminated, whereas if a pixel is on, the upper polarizer blocks light received from the volume element of liquid crystal material and the pixel is not illuminated.

Manufacturers of TN liquid crystal materials typically characterize their materials by three voltage values, $V_{90}$, $V_{50}$ and $V_{10}$. $V_{90}$ is the voltage that must be applied between a row electrode and a column electrode of a simple TN cell of the kind shown in FIG. 3 to switch the pixel at the crossing of the row and column electrodes from the off state to 90 percent transmissive in a normally black mode. Similarly, the voltages $V_{50}$ and $V_{10}$ are the voltages that must be applied in order to turn the cell from the off state to 50 percent transmissive and 10 percent transmissive, respectively, in a normally black mode. Typical values for the $V_{10}$, $V_{50}$ and $V_{90}$ are 1.5 volts, 2.0 volts and 3.1 volts. The dynamic range of the voltage required to operate the simple TN cell is therefore only about 2 volts.

The physical mechanism whereby a panel element of the PALC display panel shown in FIG. 2 switches between the off and on states is the same as that for the panel element of the simple TN liquid crystal display panel shown in FIG. 3. However, in a PALC display panel, the plasma functions as the row electrode, and therefore the potential difference between the row electrode and the column electrode is distributed between the cover sheet and the layer of liquid crystal material. Consequently, the dynamic range between the voltage $V_{th}$ (the maximum voltage at which a panel element of a PALC display panel passes substantially all of the light) and the voltage $V_{on}$ (the minimum voltage at which the panel element blocks substantially all of the light) is substantially higher than the corresponding voltage for a simple TN cell.

In many PALC displays that have been described in the literature, the difference $V_{dynamic}$ between $V_{th}$ and $V_{on}$ is 30 volts or more. It would be desirable if the value of $V_{dynamic}$ could be reduced to below 25 volts, and preferably as low as 18 volts, because this would give benefits in reduced cross talk between data drive electrodes, reduced power consumption, and reduced cost of circuits for driving the data drive electrodes. However, the literature regarding PALC display panels does not indicate a relationship between $V_{dynamic}$ and quantified or quantifiable features of the panel such as to allow one to design a PALC display panel so that $V_{dynamic}$ will have a desired value.

Manufacturers of TN liquid crystal materials are able to exercise a small degree of control over the perpendicular and parallel dielectric constants of the material without affecting the optical properties of the PALC display panel, and the thickness and the dielectric constant of the cover sheet can be varied without affecting the optical properties of the display panel. However, the thickness of the liquid crystal layer affects the optical properties of the panel as well as the electrical properties.

The contrast ratio of a TN liquid crystal display panel depends on viewing angle. One of the practical applications of the TNLC display panel is in the monitor of a laptop computer. It is generally agreed that the monitor of a laptop computer should be able to provide a contrast ratio of 10:1 over a range of angles from 45° to the left of normal, 45° to the right of normal, 30° up from normal and 10° down from normal. The resulting polyhedron defines a desired viewing solid. Practical application of a PALC display panel overlap to some extent those of a TNLC display panel, and accordingly the viewing solid requirements for a PALC display panel are, in some cases, similar to those for a TNLC display panel.

SUMMARY OF THE INVENTION

In accordance with a first aspect of the invention, there is provided a plasma addressed liquid crystal display panel comprising a channel substrate, a cover sheet, a layer of twisted nematic liquid crystal material, an upper substrate, and an array of electrodes on the lower surface of the upper substrate, and wherein $$[2.43(V_{90} - V_{50}) + V_{50}]\left[1 + \frac{d_{TD}}{d_{LC}} \cdot \frac{\varepsilon_\parallel}{\varepsilon_{TD}}\right] - 0.9V_{10}\left[1 + \frac{d_{TD}}{d_{LC}} \cdot \frac{\varepsilon_\perp}{\varepsilon_{TD}}\right] \leq 25$$

where $V_x$ is the voltage that will turn a simple TN liquid crystal cell from the off state to X% transmissive in a normally black mode, $d_{TD}$ is the thickness of the cover sheet, $d_{LC}$ is the thickness of the liquid crystal layer, $\varepsilon_{TD}$ is the dielectric constant of the cover sheet, $\varepsilon_\perp$ is the perpendicular dielectric constant of the liquid crystal material, and $\varepsilon_\parallel$ is the parallel dielectric constant of the liquid crystal material, and $d_{LC}\Delta n_{LC}$ is in the range from about 0.4 to 0.5, where $\Delta n_{LC}$ is the difference in refractive indices for the liquid crystal material.

In accordance with a second aspect of the invention, there is provided a method of operating a plasma addressed liquid crystal display panel that comprises a channel substrate, a cover sheet, a layer of twisted nematic liquid crystal material, an upper substrate, and an array of electrodes on the lower surface of the upper substrate, said method comprising driving the data drive electrodes with a voltage having a dynamic range that is less than about 25 volts and is given by $$[2.43(V_{90} - V_{50}) + V_{50}]\left[1 + \frac{d_{TD}}{d_{LC}} \cdot \frac{\varepsilon_\parallel}{\varepsilon_{TD}}\right] - 0.9V_{10}\left[1 + \frac{d_{TD}}{d_{LC}} \cdot \frac{\varepsilon_\perp}{\varepsilon_{TD}}\right]$$

where $V_x$ is the voltage that will turn a simple TN liquid crystal cell from the off state to X% transmissive in a normally black mode, $d_{TD}$ is the thickness of the cover sheet, $d_{LC}$ is the thickness of the liquid crystal layer, $\varepsilon_{TD}$ is the dielectric constant of the cover sheet, $\varepsilon_\perp$ is the perpendicular dielectric constant of the liquid crystal material, and $\varepsilon_\parallel$ is the parallel dielectric constant of the liquid crystal material, and $d_{LC}\Delta n_{LC}$ is in the range from about 0.4 to 0.5, where $\Delta n_{LC}$ is the difference in refractive indices for the liquid crystal material.

BRIEF DESCRIPTION OF THE DRAWINGS

For a better understanding of the invention, and to show how the same may be carried into effect, reference will now be made, by way of example, to the accompanying drawings, in which.

In the several figures of the drawings, like reference numerals designate corresponding components.

In the description and claims, words of orientation and position, such a upper and lower, are used to establish orientation relative to the drawings and are not intended to be limiting in an absolute sense.

DETAILED DESCRIPTION

Figure 1:
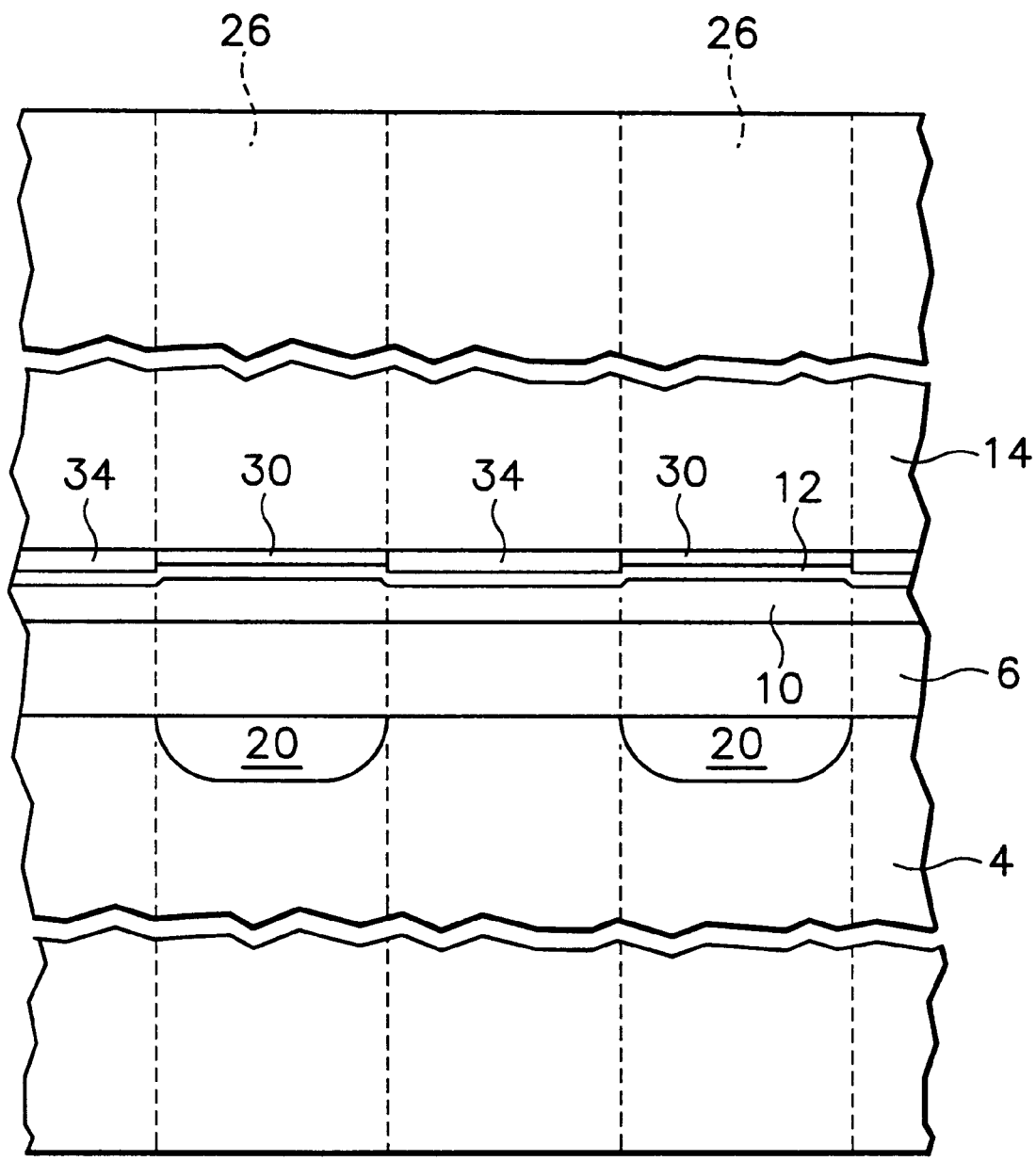
FIG. 1 is a schematic partial sectional view of a plasma addressed liquid crystal display panel in accordance with the present invention.
Figure 2:
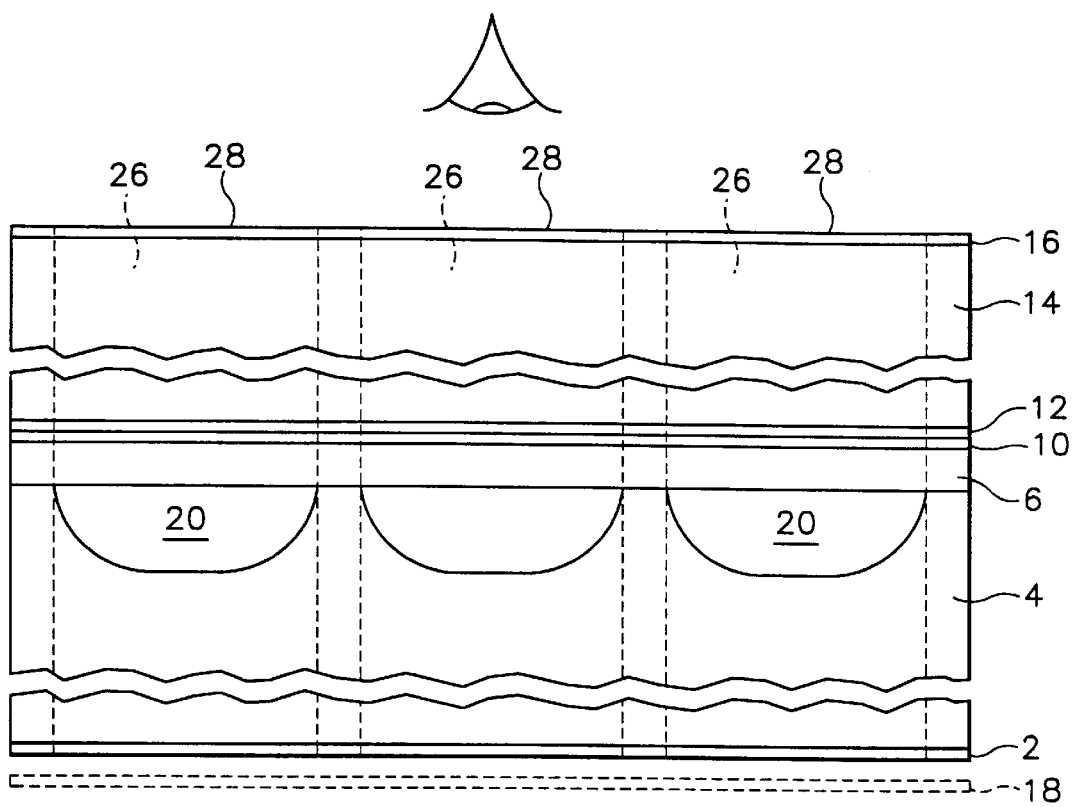
FIG. 2 is a schematic partial sectional view of a plasma addressed liquid crystal display panel in accordance with the prior art.
Figure 3:
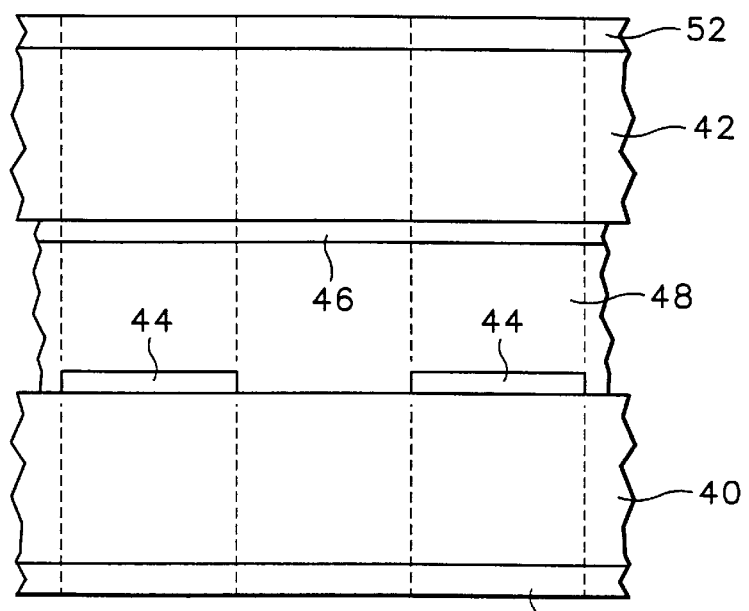
FIG. 3 is a schematic partial sectional view of twisted nematic liquid crystal display panel in accordance with the prior art.

FIG. 1 illustrates a PALC color display panel in which color filter material is provided on the lower surface of the upper substrate 14 before the data drive electrodes 12 are deposited. Thus, each panel element 26 includes a color filter 30 between the data drive electrode and the upper substrate 14. FIG. 1 also illustrates black surround material 34 between adjacent color filters. Within the panel element 26, the layer 10 of TN liquid crystal material is bounded by the cover sheet 6 and the data drive electrode 12. Thus, in the panel element 26, the sequence of components from the channel 20 to the upper substrate 14 consists of the cover sheet 6, the layer 10, the data drive electrode 12 and the color filter 30, in that order.

It has been found empirically and through analysis that the dynamic range of the voltage signal that must be applied between the data drive electrode and ground electrode of a PALC display panel having the configuration shown in FIG. 1 in order to switch a panel element from off to on is given by:

$$V_{dynamic} = [2.43(V_{90} - V_{50}) + V_{50}]\left[1 + \frac{d_{TD}}{d_{LC}} \cdot \frac{\varepsilon_\parallel}{\varepsilon_{TD}}\right] - 0.9V_{10}\left[1 + \frac{d_{TD}}{d_{LC}} \cdot \frac{\varepsilon_\perp}{\varepsilon_{TD}}\right] \quad \text{Equation 1}$$

where $V_x$ (X=10, 50 or 90) is the voltage that will turn a simple TN liquid crystal cell in the normally black mode from the off state to X% transmissive, $d_{TD}$ is the thickness of the cover sheet, $d_{LC}$ is the thickness of the liquid crystal layer, $\varepsilon_{TD}$ is the dielectric constant of the cover sheet, $\varepsilon_\perp$ is the perpendicular dielectric constant of the liquid crystal material, and $\varepsilon_\parallel$ is the parallel dielectric constant of the liquid crystal material. For a given value of $V_{dynamic}$, there is a surface in a seven dimensional space for which the relationship in Equation 1 holds true. Moreover, for a viewing solid having a commercially acceptable configuration $$d_{LC}\Delta n_{LC} \approx 0.4 - 0.5 \quad \text{Equation 2}$$

where $\Delta n_{LC}$ is the difference between the ordinary and extraordinary refractive indices for the liquid crystal material.

The value of $d_{LC}\Delta n_{LC}$ depends on the desired viewing solid and on the pre-tilt of the alignment layer with respect to the lower surface of the upper substrate. Generally, one will initially set $d_{LC}\Delta n_{LC}$ to about 0.45 and iteratively adjust the value of $d_{LC}$ until the desired viewing solid is obtained.

For a given TN liquid crystal material for which the values of $V_x$ are known, Equation 1 can be simplified. For example, typical values of $V_{10}$, $V_{50}$ and $V_{90}$ for a commercially available TN liquid crystal material are, respectively, 1.5 volts, 2.0 volts and 3.1 volts, and so:

$$V_{dynamic}=4.673R\cdot\epsilon_{\parallel}-1.35R\cdot\epsilon_{\perp}+3.323$$

where $$R = \frac{d_{TD}}{d_{LC}\cdot\epsilon_{TD}}$$

If the desired value of $V_{dynamic}$ is 20 volts, then $$R\cdot\epsilon_{\perp}=3.4615R\cdot\epsilon_{\parallel}-12.353$$

The value of $\Delta n_{LC}$ is from about 0.04 to 0.16 and for a given liquid crystal material, the specific value of $\Delta n_{LC}$ will set a range of values of $d_{LC}$ in accordance with Equation 2. The values of $d_{TD}$, $\epsilon_{TD}$, $\epsilon\perp$ and $\epsilon_{\parallel}$ can then be selected to return the desired value of $V_{dynamic}$. If it should be found for a particular selection of values that the viewing solid is not acceptable, $d_{LC}$ can be changed but $d_{TD}$ can be adjusted to keep R constant.

It can therefore be seen that if all the parameters other than $d_{TD}$, $\epsilon_{TD}$ and the perpendicular and parallel dielectric constants of the liquid crystal material are predetermined on the basis of optical requirements, the values of $d_{TD}$ and the dielectric constants can be adjusted, subject to restraints of practical values, to achieve a specific value of the $V_{dynamic}$.

Currently, the cover sheet of a PALC display panel is approximately 30 μm in thickness, but it may be possible to fabricate cover sheets less than 20 μm in thickness, and even as small as 5 μm in thickness, particularly by use of the in situ thinning procedure described in copending Provisional Application No. 60/018,000. Equation 1 provides a rational and quantitative basis for predicting the effect on $V_{dynamic}$ of a change in thickness of the cover sheet. For example, when reasonable values of the variable other than $d_{TD}$ are used, Equation 1 shows that by reducing the cover sheet thickness from 30 μm to 5 μm, $V_{dymanic}$ can be reduced by at least 50 percent. It also allows one to determine what other parameters would need to be changed, and to what extent, in order to provide an effect equivalent to a given change in the thickness of the cover sheet.

It will be appreciated that the invention is not restricted to the particular embodiment that has been described, and that variations may be made therein without departing from the scope of the invention as defined in the appended claims and equivalents thereof.

We claim:

1. A plasma addressed liquid crystal display panel comprising:

a channel substrate, a cover sheet, a layer of twisted nematic liquid crystal material, an upper substrate, and an array of electrodes on the lower surface of the upper substrate, and wherein $$[2.43(V_{90}-V_{50})+V_{50}]\left[1+\frac{d_{TD}}{d_{LC}}\cdot\frac{\epsilon_{\parallel}}{\epsilon_{TD}}\right]-0.9V_{10}\left[1+\frac{d_{TD}}{d_{LC}}\cdot\frac{\epsilon_{\perp}}{\epsilon_{TD}}\right]\leq 25$$

where $V_x$ is the voltage that will turn a simple TN liquid crystal cell from the off state to X% transmissive in a normally black mode, $d_{TD}$ is the thickness of the cover sheet, $d_{LC}$ is the thickness of the liquid crystal layer, $\epsilon_{TD}$ is the dielectric constant of the cover sheet, $\epsilon_{\perp}$ is the perpendicular dielectric constant of the liquid crystal material, and $\epsilon_{\parallel}$ is the parallel dielectric constant of the liquid crystal material, and $d_{LC}\Delta n_{LC}$ is in the range from about 0.4 to 0.5, where $\Delta n_{LC}$ is the difference in refractive indices for the liquid crystal material.

2. A method of operating a plasma addressed liquid crystal display panel that comprises a channel substrate, a cover sheet, a layer of twisted nematic liquid crystal material, an upper substrate, and an array of electrodes on the lower surface of the upper substrate, said method comprising driving the data drive electrodes with a voltage having a dynamic range that is less than about 25 volts and is given by $$[2.43(V_{90}-V_{50})+V_{50}]\left[1+\frac{d_{TD}}{d_{LC}}\cdot\frac{\epsilon_{\parallel}}{\epsilon_{TD}}\right]-0.9V_{10}\left[1+\frac{d_{TD}}{d_{LC}}\cdot\frac{\epsilon_{\perp}}{\epsilon_{TD}}\right]$$

where $V_x$ is the voltage that will turn a simple TN liquid crystal cell from the off state to X% transmissive in a normally black mode, $d_{TD}$ is the thickness of the cover sheet, $d_{LC}$ is the thickness of the liquid crystal layer, $\epsilon_{TD}$ is the dielectric constant of the cover sheet, $\epsilon_{\perp}$ is the perpendicular dielectric constant of the liquid crystal material, and $\epsilon_{\parallel}$ is the parallel dielectric constant of the liquid crystal material, and $d_{LC}\Delta n_{LC}$ is in the range from about 0.4 to 0.5, where $\Delta n_{LC}$ is the difference in refractive indices for the liquid crystal material.

* * * * *